United States Patent
Sanders

(10) Patent No.: US 9,942,642 B2
(45) Date of Patent: Apr. 10, 2018

(54) CONTROLLING OPERATION OF A MEDIA DEVICE BASED UPON WHETHER A PRESENTATION DEVICE IS CURRENTLY BEING WORN BY A USER

(71) Applicant: Apple Inc., Cupertino, CA (US)

(72) Inventor: Christopher John Sanders, San Jose, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 14/612,221

(22) Filed: Feb. 2, 2015

(65) Prior Publication Data

US 2015/0208158 A1 Jul. 23, 2015

Related U.S. Application Data

(63) Continuation of application No. 13/150,575, filed on Jun. 1, 2011, now Pat. No. 8,954,177.

(51) Int. Cl.
*H04R 1/10* (2006.01)
*G06F 3/01* (2006.01)
(Continued)

(52) U.S. Cl.
CPC .......... *H04R 1/1041* (2013.01); *G06F 3/011* (2013.01); *G06F 3/017* (2013.01); *G11B 19/08* (2013.01);
(Continued)

(58) Field of Classification Search
CPC ......... G06F 3/011; G06F 3/017; G11B 19/08; H04R 1/1041; H04M 1/6058; H04M 1/6066; H04M 1/72569; H04M 2250/12
(Continued)

(56) References Cited

U.S. PATENT DOCUMENTS 3,794,779 A 2/1974 Greuzerd et al.
3,796,840 A 3/1974 Ohta
(Continued)

FOREIGN PATENT DOCUMENTS

JP 10028169 1/1998
WO 2011146659 11/2011

OTHER PUBLICATIONS

"Method and System is Disclosed for Modifying Audio Channel Routing Based on Operational Condition Associated with One or More Audio Devices." Jul. 16. 2010 (3 pages).
(Continued)

*Primary Examiner* — Md S Elahee

(57) ABSTRACT

A mechanism is provided for automatically controlling the operation of a media device based upon whether a portable presentation device coupled to the media device is currently being worn by a user. A portable presentation device may be any device that is meant to be worn by a user that is capable of presenting media content to the user (e.g. earphones, headphones, goggles or faceplates with video/audio capability, etc.). With this mechanism, a user can affect the operation of the media device by simply putting on or taking off the portable presentation device. The user does not need to manually manipulate the controls of the media device. By automatically controlling the operation of the media device in this manner, use of the media device and the portable presentation device as a unit is made much simpler and more convenient.

13 Claims, 3 Drawing Sheets

(51) Int. Cl.
*G11B 19/08* (2006.01)
*H04M 1/60* (2006.01)
*H04M 1/725* (2006.01)

(52) U.S. Cl.
CPC ........ *H04M 1/6058* (2013.01); *H04M 1/6066* (2013.01); *H04M 1/72569* (2013.01); *H04M 2250/12* (2013.01)

(58) Field of Classification Search
USPC ............... 379/201.1, 430; 455/41.3; 381/333
See application file for complete search history.

(56) References Cited

U.S. PATENT DOCUMENTS

| | | | |
|---|---|---|---|
| 4,090,504 A * | 5/1978 | Nathan | A61B 5/02055 128/DIG. 15 |
| 5,144,678 A | 9/1992 | Lenz | |
| 5,337,353 A | 8/1994 | Boie et al. | |
| 5,729,604 A | 3/1998 | Van Schyndel | |
| 5,937,070 A | 8/1999 | Todter et al. | |
| 6,118,878 A | 9/2000 | Jones | |
| 6,614,912 B1 | 9/2003 | Yamada et al. | |
| 6,817,440 B1 | 11/2004 | Kim | |
| 7,069,018 B1 | 6/2006 | Granstam et al. | |
| 7,590,233 B2 * | 9/2009 | Chiloyan | H04R 1/1033 379/430 |
| 7,925,029 B2 | 4/2011 | Hollemans | |
| 8,019,096 B2 | 9/2011 | Sander et al. | |
| 8,199,956 B2 | 6/2012 | Haartsen et al. | |
| 8,238,590 B2 | 8/2012 | Burge | |
| 8,428,053 B2 | 4/2013 | Kannappan | |
| 8,521,239 B2 | 8/2013 | Hosoi et al. | |
| 8,945,177 B2 | 2/2015 | Sanders | |
| 2002/0090103 A1 * | 7/2002 | Calisto, Jr. | H04B 1/086 381/333 |
| 2004/0138723 A1 | 7/2004 | Malick et al. | |
| 2005/0170859 A1 | 8/2005 | Koike et al. | |
| 2005/0250553 A1 | 11/2005 | Lim | |
| 2006/0013079 A1 | 1/2006 | Rekimoto | |
| 2006/0108167 A1 * | 5/2006 | Finger | B60N 2/002 180/268 |
| 2006/0233413 A1 | 10/2006 | Nam | |
| 2006/0256133 A1 | 11/2006 | Rosenberg | |
| 2007/0076897 A1 | 4/2007 | Philipp | |
| 2007/0121959 A1 * | 5/2007 | Philipp | H04R 1/1041 381/74 |
| 2007/0169615 A1 | 7/2007 | Chidlaw et al. | |
| 2008/0157991 A1 * | 7/2008 | Raghunath | G11B 31/02 340/686.1 |
| 2008/0158000 A1 | 7/2008 | Mattrazzo | |
| 2008/0220831 A1 | 9/2008 | Alameh et al. | |
| 2008/0303947 A1 | 12/2008 | Ohnishi et al. | |
| 2009/0112696 A1 | 4/2009 | Jung et al. | |
| 2009/0131124 A1 | 5/2009 | Bibaud et al. | |
| 2009/0285408 A1 | 11/2009 | Kimura | |
| 2010/0020998 A1 | 1/2010 | Brown et al. | |
| 2010/0022283 A1 | 1/2010 | Terlizzi | |
| 2010/0128887 A1 | 5/2010 | Lee et al. | |
| 2010/0183175 A1 | 7/2010 | Chen et al. | |
| 2010/0019736 A1 | 8/2010 | Namgoong et al. | |
| 2010/0310087 A1 | 12/2010 | Ishida | |
| 2010/0310097 A1 | 12/2010 | Chang | |
| 2011/0021182 A1 | 1/2011 | Huan | |
| 2011/0116643 A1 | 5/2011 | Tiscareno et al. | |
| 2011/0144779 A1 | 6/2011 | Janse et al. | |
| 2011/0187868 A1 | 8/2011 | Chang et al. | |
| 2011/0196519 A1 | 8/2011 | Khoury et al. | |
| 2011/0286615 A1 | 11/2011 | Olodort et al. | |
| 2012/0086551 A1 | 4/2012 | Lowe et al. | |
| 2012/0114154 A1 | 5/2012 | Abrahamasson | |
| 2012/0207317 A1 | 8/2012 | Abdollahzadeh Milani et al. | |
| 2012/0230699 A1 | 9/2012 | Burnett | |
| 2012/0244812 A1 * | 9/2012 | Rosener | H04M 1/05 455/41.3 |
| 2012/0244917 A1 | 9/2012 | Hosoi | |
| 2013/0038458 A1 | 2/2013 | Toivola | |
| 2013/0075595 A1 | 3/2013 | Ruh | |
| 2013/0083933 A1 | 4/2013 | Aase | |
| 2013/0094659 A1 | 4/2013 | Liu | |
| 2013/0121494 A1 | 5/2013 | Johnston | |
| 2013/0163783 A1 | 6/2013 | Burlingame | |
| 2013/0236027 A1 | 9/2013 | Tao | |
| 2014/0016803 A1 | 1/2014 | Puskarich | |
| 2014/0146976 A1 | 5/2014 | Rundle | |
| 2014/0146979 A1 | 5/2014 | Puskarich | |
| 2014/0146982 A1 | 5/2014 | Pelosi | |

OTHER PUBLICATIONS

Acker at al., Smart Audio Output With Presence Sensors: Enabling Mode Switching Using Head Sets or Ear Buds Synaptics Incorporated, San Jose, California, Nov. 2, 2005(10 pages).

"Automated Play/Pause of Music Based on Aggregated Sensor Data," Feb. 2, 2012 (3 pages).

Free on iPhone: Free Apps, Review for iPhone, "iPhone Proximity Sensor", posted Jan. 2, 2009, retrieved Sep. 1, 2011.

Hisahiro Moriuchi "Universal Earphones: Earphones with Automatic Side and Shared Use Detection", 2012, 1 page.

* cited by examiner

CONTROLLING OPERATION OF A MEDIA DEVICE BASED UPON WHETHER A PRESENTATION DEVICE IS CURRENTLY BEING WORN BY A USER

This application is a continuation of U.S. patent application Ser. No. 13/150,575, filed Jun. 1, 2011, which is hereby incorporated by reference herein in its entirety. This application claims the benefit of and claims priority to U.S. patent application Ser. No. 13/150,575, filed Jun. 1, 2011.

BACKGROUND

Most media devices, such as music players and video players, have a headphone jack for allowing a set of earphones or headphones to be used to deliver sound to a user. With the use of earphones or headphones, the user is able to enjoy the audio portion of a set of media content in private, without disturbing the people around the user. The use of earphones or headphones also allows quality sound to be delivered to the user without the need for cumbersome external speakers.

Currently, to control whether audio content is provided by a media device to a set of earphones or headphones, the controls on the media device are used. That is, to start, stop, or alter the delivery of the audio content to the earphones or headphones, a user usually has to manually manipulate the controls that are on the media device. Some earphones and headphones now come with controls that a user can use to send control signals to the media device. With these earphones or headphones, the user can control the media device without physically accessing the controls of the media device. In either of these cases, however, in order to control the delivery of the audio content to the earphones or headphones, the user has to manually manipulate at least some set of controls.

This can be inconvenient and bothersome in some instances. For example, suppose that a user is using a set of earphones that does not have controls for sending control signals to the media device, and that the media device that is providing audio content to the earphones is in the user's pocket. Suppose further that a colleague wishes to speak with the user. Before beginning the conversation, the user has to fumble around in his/her pocket to find the media device, invoke the proper control on the media device to pause or stop delivery of the audio content, and remove the earphones from his/her ears. All the while, the colleague is waiting. After the conversation, the user has to reinsert the earphones in his/her ears, invoke the proper control on the media device to restart the delivery of the audio content, and put the media device back in his/her pocket. This can be inconvenient enough for just one interruption, but if the user is interrupted frequently by colleagues, this process of finding the media device and invoking its controls can quickly become tedious and bothersome.

BRIEF DESCRIPTION OF THE DRAWING(S)

DETAILED DESCRIPTION OF EMBODIMENT(S)

Overview

Figure 1:
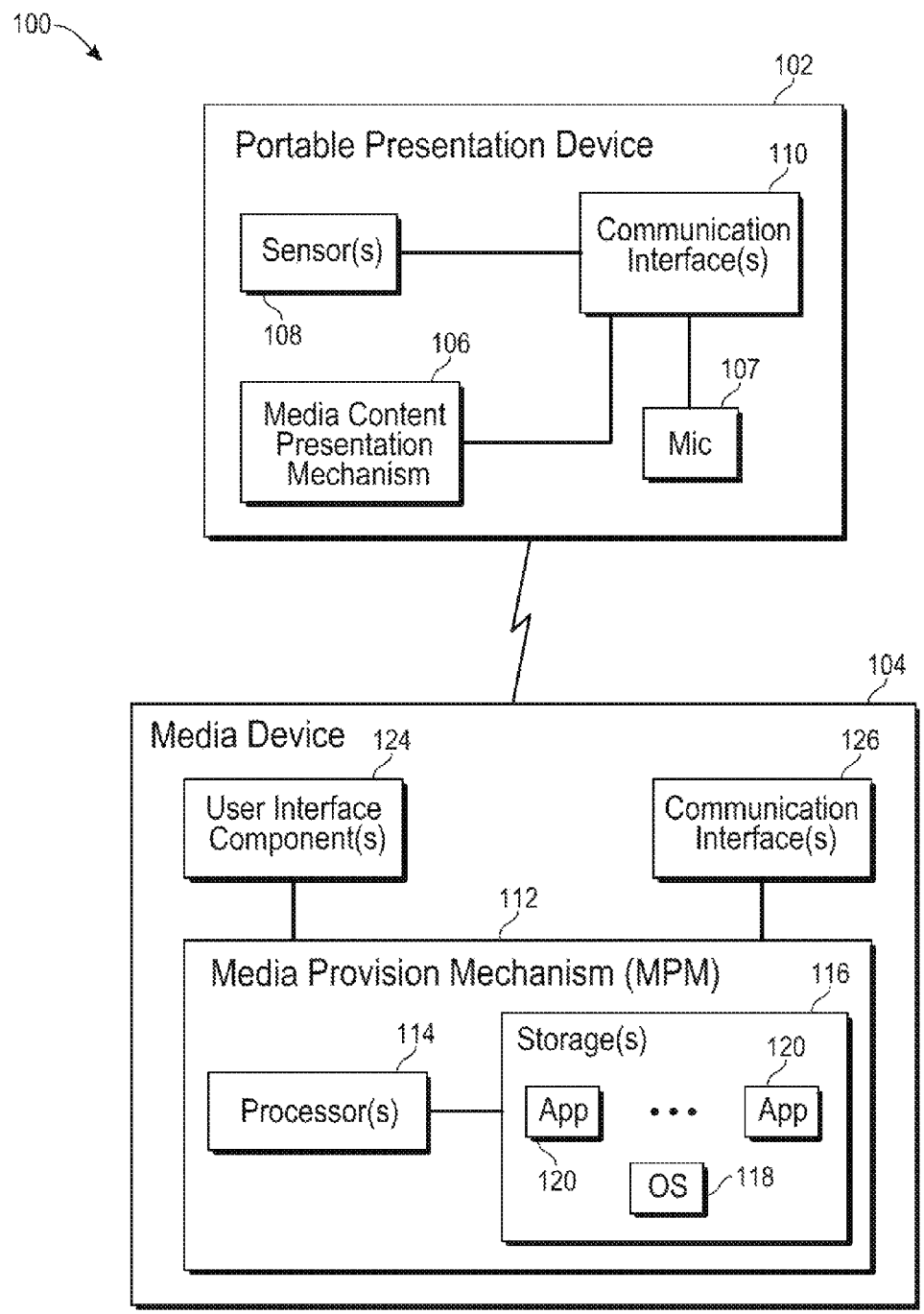
FIG. 1 is a block diagram of a system, including a media device and a portable presentation device, in which one embodiment of the present invention may be implemented.

In accordance with one embodiment of the present invention, a mechanism is provided for automatically controlling the operation of a media device based, at least in part, upon whether a portable presentation device coupled to the media device is currently being worn by a user. With this mechanism, a user can affect the operation of the media device by simply putting on or taking off the portable presentation device. The user does not need to manually manipulate the controls of the media device. By automatically controlling the operation of the media device in this manner, use of the media device and the portable presentation device as a unit is made much simpler and more convenient.

For purposes of the present invention, a portable presentation device may be any device that is meant to be worn by a user and that is capable of presenting media content (e.g. audio, video, etc.) to the user. Examples of a portable presentation device include but are not limited to earphones or earpieces, headphones, goggles or faceplates with display and sound producing capability, etc. In one embodiment, a portable presentation device includes one or more sensors. These sensors provide sensor information that can be used to determine whether the portable presentation device is currently being worn by the user. Based upon this determination, operation of the media device can be adjusted accordingly.

In one embodiment, the operation of a media device may be controlled as follows. Initially, the media device provides a set of media content to the portable presentation device for presentation to a user. At the time the media content is provided to the user, the portable presentation device is worn by the user in a manner that suggests that the user wishes to have media content presented to him/her (e.g. the user has a set of earphones in his/her ears). Thereafter, the media device receives a set of sensor information from the portable presentation device indicating a current physical relationship between the user and the portable presentation device. Using this sensor information, the media device determines whether the portable presentation device is still being worn by the user in a manner that suggests that the user wishes to have media content presented to him/her. Based at least in part upon this determination, the media device determines its future operation.

For example, if the media device determines that the portable presentation device is no longer being worn by the user in a manner that suggests that the user wishes to have media content presented to him/her, the media device may automatically halt provision of media content to the portable presentation device. The media device may also put itself into a reduced power consumption mode (e.g. sleep mode). The media device may do this immediately or after provision of content has been halted for a certain amount of time. Thereafter, if the media device determines that the portable presentation device is once again being worn by the user in a manner that suggests that the user wishes to have media content presented to him/her, the media device may automatically resume providing media content to the portable presentation device. Thus, based upon whether the portable presentation device is currently being worn by the user in a manner that suggests that the user wishes to have media content presented to him/her, the media device determines what the user would like it to do, and adjusts its behavior automatically. By doing so, the media device relieves the user from having to manually invoke controls to control the operation of the media device. This in turn makes using the media device and the portable presentation device as a unit more convenient, pleasant, and power efficient.

Sample System

With reference to FIG. 1, there is shown a block diagram of a sample system 100 in which one embodiment of the present invention may be implemented. As shown, the system 100 includes a portable presentation device 102, and a media device 104 communicatively coupled to the portable presentation device 102. The devices may be coupled via a physical coupling (e.g. one or more wires or cables), a wireless coupling (e.g. WiFi, Bluetooth, etc.), or some other coupling that allows the devices to communicate with each other.

Portable Presentation Device

In one embodiment, the portable presentation device 102 may be any device that is meant to be worn by a user and that is capable of presenting media content to the user. As used herein, the term media content refers broadly to any type of content that may be presented to a user including but not limited to audio content (e.g. music, speech, sounds, etc.), video content (e.g. graphics, stills, motion pictures, text, etc.), content from a communication (e.g. voice or speech content from a telephone call, speech and video content from a video conference, etc.), or any other type of content. Examples of a portable presentation device 102 include but are not limited to: a single or a pair of earphones that are meant to be inserted into a user's ear(s); a headphone or a set of headphones that are meant to go over and cover one or both of the user's ears; and an earpiece that is meant to be inserted into a user's ear. A portable presentation device 102 may also be a set of goggles that fit over the user's eyes with display and perhaps sound producing capability, a faceplate that covers the front of the user's face with display and perhaps sound producing capability, or any other headwear that has display and perhaps sound producing capability. These and other devices may be used as the portable presentation device 102. The portable presentation device 102 may be a wired device or a wireless (e.g. WiFi, Bluetooth, etc.) device.

The portable presentation device 102 includes a media content presentation mechanism 106. The presentation mechanism 106 is the mechanism that presents the media content received from the media device 104 to the user. For purposes of the present invention, the presentation mechanism 106 may include one or more of the following: one or more speakers for rendering audio content; one or more displays for rendering visual content; and any other device(s) capable of rendering any type of media content to the user. The portable presentation device 102 may also include a microphone 107. As will be explained in a later section, the portable presentation device 102 and the media device 104 may be used as an overall communication device. With the microphone 107, the portable presentation device 102 is able to capture audio content (e.g. voice signals) from the user and provide it to the media device 104 to be forwarded to a party with which the user is communicating.

The portable presentation device 102 also includes one or more sensor(s) 108. These sensor(s) 108 sense the physical presence of a user, and provide sensor information indicating a current physical relationship between the portable presentation device 102 and a user. This sensor information can be used by the media device 104 to determine whether the portable presentation device 102 is currently being worn by the user in a manner that suggests that the user wishes to have media content presented to him/her. For purposes of the present invention, any type and any number of sensors (e.g. one or more sensors) may be included with the portable presentation device 102. Examples of sensors that may be used include but are not limited to a proximity sensor (e.g. an infra-red sensor, a laser sensor, a SONAR sensor, or any other type of sensor that can sense distance/proximity), a temperature sensor, and a pressure sensor.

Sensor(s) 108 may be placed at various locations on the portable presentation device 102. Where the sensors are placed will depend upon the form that the portable presentation device 102 takes. For example, if the portable presentation device 102 takes the form of an earphone, a proximity sensor may be placed in a part of the earphone that faces the user's ear when the earphone is inserted. That way, the proximity sensor will be able to sense that the user is within close proximity. A temperature sensor may be placed on an outer portion of the earphone that contacts the user's skin when the earphone is inserted. That way, the temperature sensor will be able to sense the heat from the user's body. A pressure sensor may be placed at an exterior portion of the earphone that gets pressed against the inner part of the user's ear when the earphone is inserted. That way, the pressure sensor will be able to sense that the earphone has been pressed into the user's ear.

If the portable presentation device 102 is a headphone that goes over one or more of the user's ears, a proximity sensor may be placed in a part of the headphone that goes over and faces the user's ear when the headphone is worn. A temperature sensor may be placed on a part of the headphone that covers and contacts the user's ear when the headphone is worn. A pressure sensor may be placed at a portion of the earphone that gets pressed against the user's ear when the headphone is worn.

As a further example, if the portable presentation device is a set of audio/visual goggles that are worn over the user's eyes with a strap that goes around the user's head, a proximity sensor may be placed in a part of the goggles that faces the user when the goggles are worn. A temperature sensor may be placed on a part of the strap that contacts the user's skin when the goggles are worn. A pressure sensor may be placed at a portion of the strap that gets pressed against the user's head when the goggles are worn. The sensor(s) 108 may be positioned in the manner described or in any other manner. All possible manners of placement of the sensors are within the scope of the present invention.

As noted above, a primary purpose of the sensor(s) 108 is to provide sensor information that the media device 104 can use to determine whether the user is currently wearing the portable presentation device 102 in a manner that suggests that the user wishes to have media content presented to him/her. The more sensor information that is provided to the media device 104, the more accurate this determination will be. In one embodiment, to minimize false positives (i.e. concluding that a user is wearing the portable presentation device 102 when he/she is not), multiple sensors of different types may be included in the portable presentation device 102. For example, the portable presentation device 102 may include: (1) one or more proximity sensors, one or more temperature sensors, and one or more pressure sensors; (2) one or more proximity sensors and one or more temperature sensors; (3) one or more proximity sensors and one or more pressure sensors; or (4) one or more temperature sensors and one or more pressure sensors. Having information from multiple types of sensors will enable the media device 104 to make more accurate determinations.

In one embodiment, the determination that is made by the media device 104 is not whether the portable presentation device 102 is being worn by the user, but whether the portable presentation device 102 is being worn by the user in a manner that suggests that the user wishes to have media content presented to him/her. It is possible for a user to wear the portable presentation device 102 but not in a manner that suggests that the user wishes to have media content presented to him/her. For example, a user could have a set of earphones around his/her neck. Technically, he/she is wearing the earphones, but he/she is not wearing the earphones in a way that suggests that he/she wishes to have media content presented to him/her. The more sensor information, and the more types of sensor information that is provided to the media device 104, the better equipped the media device 104 will be to distinguish between a situation in which the user is just wearing the earphones (e.g. around his/her neck) and another in which the user is wearing the earphones in a manner that suggests that the user wishes to have media content presented to him/her (e.g. the earphones are actually inserted in the user's ears).

In addition to the components described above, the portable presentation device 102 further includes one or more communication interface(s) 110. The communication interface(s) 110 are coupled to the presentation mechanism 106, the microphone 107, the sensor(s) 108, and the media device 104, and allow information to be exchanged between the various components. For example, communication interface(s) 110 allow media content to be received from the media device 104 and delivered to the presentation mechanism 106. Communication interface(s) 110 also allow audio signals from the microphone 107 and sensor information from the sensor(s) 108 to be delivered to the media device 104. For purposes of the present invention, the communication interface(s) 110 may include any interfaces that facilitate communication and exchange of information between the portable presentation device 102 and the media device 104. These interfaces may include, for example, a port for sending information to and receiving information from an audio and/or video jack of the media device 104, and a wireless transmitter/receiver for exchanging wireless information with the media device 104. These and other interfaces may be included in the communication interface(s) 110.

For purposes of the present invention, the portable presentation device 102 may send sensor information to the media device 104 using a notification protocol, a polling protocol, or some other protocol. With a notification protocol, the portable presentation device 102 sends sensor information to the media device 104 only when there is a change in the state of one or more of the sensor(s) 108 (e.g. a proximity sensor changes from indicating that the user is nearby to indicating that the user is not nearby, or a temperature sensor indicates that it is no longer sensing the user's body heat, or a pressure sensor indicates that it is no longer being pressed against the user, etc.). To implement the notification protocol, some circuitry may be included in the communication interface(s) 110 to determine when the state of one or more of the sensor(s) 108 has changed, and to send sensor information to the media device 104 when such a change is detected. With a polling protocol, the portable presentation device 102 periodically sends sensor information to the media device 104 regardless of whether the state of any one of the sensor(s) 108 has changed. To implement the polling protocol, some circuitry may be included in the communication interface(s) 110 to receive periodic requests (e.g. pings) from the media device 104 for sensor information, and to provide sensor information to the media device 104 in response to such requests. For purposes of the present invention, the communication interface(s) 110 may include circuitry for implementing these and other information exchange protocols between the portable presentation device 102 and the media device 104.

In the embodiment described herein, it is assumed for the sake of illustration that the information provided by the portable presentation device 102 to the media device 104 is sensor information, and that it is up to the media device 104 to use this sensor information to determine whether the user is currently wearing the portable presentation device 102. However, it should be noted that, if so desired, the portable presentation device 102 may provide other types of information instead. For example, the communication interface(s) 110 of the portable presentation device 102 may include circuitry for evaluating the sensor information from the sensor(s) 108, and determining based upon the sensor information whether the user is currently wearing the portable presentation device 102. The communication interface(s) 110 may then provide status information (rather than sensor information) to the media device 104 that indicates a determination as to whether the portable presentation device 102: (1) is not being worn by the user; (2) is fully being worn by the user: or (3) is partially being worn by the user (e.g. the user may be wearing only one earphone of a pair of earphones). If the portable presentation device 102 provides this type of status information, the media device 104 will be relieved of having to process the sensor information (note: the status information would still indicate a current physical relationship between the user and the portable presentation device 102, and the media device 104 would still use this information to determine whether the user is currently wearing the portable presentation device 102; the media device 104 would, however, be relieved of having to process the raw sensor information). Both embodiments have their advantages and disadvantages. Which embodiment is chosen will depend upon the constraints of each particular implementation. Both embodiments, and other potential embodiments, are within the scope of the present invention.

Media Device

The portable presentation device 102 is coupled to the media device 104. The media device 104 interacts with the portable presentation device 102 to exchange media content, and to receive sensor information. For purposes of the present invention, the media device 104 may take the form of any device capable of interacting and communicating with the portable presentation device 102. In one embodiment, the media device 104 comprises a media provision mechanism (MPM) 112, a set of user interface(s) components 124, and a set of communication interface(s) 126.

In one embodiment, the MPM 112 is the mechanism on the media device 104 that provides/receives media content to/from the portable presentation device 102. The MPM 112 is also the mechanism that receives sensor information from the sensor(s) 108 of the portable presentation device 102, and uses the sensor information to determine whether the portable presentation device 102 is currently being worn by a user in a manner that suggests that the user wishes to have media content presented to him/her. Based at least in part upon this determination, the MPM 112 automatically determines how it, and hence, how the media device 104 should behave (e.g. whether to provide media content to the portable presentation device 102). This automatic behavior determining functionality of the MPM 112 will be elaborated upon in a later section.

For purposes of the present invention, the functionality of the MPM 112 may be realized using any desired technology.

For example, the MPM 112 may be implemented as a special purpose electronic device (e.g. a stereo system, a media player, etc.) using analog and/or digital electronic circuit elements that are arranged and configured to implement the functionality described herein. Alternatively, the MPM 112 may be implemented using one or more devices (e.g. a programmable logic array) having an array of electronic circuit elements, including logic elements, that are programmed/configured to implement the functionality described herein. As a further alternative, the MPM 112 may be implemented by way of an application specific integrated circuit (ASIC) having electronic circuit elements, including logic elements, that are constructed/configured to implement the functionality described herein. As yet a further alternative, the functionality of the MPM 112 may be realized by having one or more processors execute one or more sets of software (e.g. executable instructions). These and other implementations are possible, and all such implementations are within the scope of the present invention.

As shown in FIG. 1, the MPM 112 in one embodiment is implemented by way of one or more processors executing one or more sets of instructions. As shown, the MPM 112 comprises one or more processor(s) 114 coupled to one or more storage(s) 116 (also referred to herein as computer readable storage media). Storage(s) 116 may be used to store executable programs, one or more sets of media content, permanent data, temporary data that is generated during program execution, and any other information needed to carry out computer processing. Storage(s) 116 may include any and all types of storages that may be used to carry out computer processing. For example, storage(s) 116 may include main memory (e.g. random access memory (RAM) or other dynamic storage device), cache memory, read only memory (ROM), permanent storage (e.g. one or more magnetic disks or optical disks, flash storage, etc.), as well as other types of storage. The various storages 116 may be volatile or non-volatile. Common forms of computer readable storage media include, for example, a floppy disk, a flexible disk, hard disk, magnetic tape, or any other magnetic medium, a CD-ROM, DVD, or any other optical storage medium, punchcards, papertape, or any other physical medium with patterns of holes, a RAM, a PROM, an EPROM, a FLASH-EPROM or any other type of flash memory, any memory chip or cartridge, and any other storage medium from which a computer can read.

As shown in FIG. 1, storage(s) 116 store at least several sets of executable instructions, including an operating system 118 and one or more applications 120. The processor(s) 114 execute the operating system 118 to provide a platform on which other sets of software may operate, and execute one or more of the applications 120 to provide additional, specific functionality. In one embodiment, the automatic behavior determining functionality of the MPM 112 is achieved by way of cooperation between the operating system 118 and one or more of the applications 120.

To elaborate, in one embodiment, it is the operating system 118 that receives sensor information from the sensor(s) 108 of the portable presentation device 102. As noted previously, sensor information may be provided by the portable presentation device 102 using a notification protocol, a polling protocol, or some other protocol. With the notification protocol, the operating system 118 passively listens for sensor information. When sensor information is actually sent by the portable presentation device (e.g. in response to a change in the state of one or more of the sensor(s) 108), the operating system 118 receives the sensor information and processes it. With the polling protocol, the operating system 118 takes a more active approach. Specifically, the operating system 118 periodically pings the portable presentation device 102 for sensor information. When the requested sensor information is received from the portable presentation device 102, the operating system 118 processes it. The operating system 118 may receive sensor information from the portable presentation device using other protocols as well.

Upon receiving the sensor information, the operating system 118 processes it, and provides its conclusions to the application 120. For example, the operating system 118 may receive sensor information from a proximity sensor, process the sensor information to determine whether a user is within close proximity to the portable presentation device 102, and provide its conclusion (e.g. in the form of an affirmative or negative) to the application 120. Similarly, the operating system 118 may receive sensor information from a temperature sensor, process the sensor information to determine whether the temperature indicates that the user is in contact with the temperature sensor, and provide its conclusion to the application 120. Furthermore, the operating system 118 may receive sensor information from a pressure sensor, process the sensor information to determine whether the pressure reading indicates that the portable presentation device 102 is pressed against the user, and provide its conclusion to the application 120. Based upon these conclusions, the application 120 can determine whether the portable presentation device 102 is currently being worn by the user in a manner that suggests that the user wishes to have media content presented to him/her. Then, based at least in part upon this determination, the application 120 can determine how it should behave (e.g. whether to provide media content to the portable presentation device 102). In this manner, the operating system 118 and the application 120 cooperate to achieve the automatic behavior determining functionality of the MPM 112.

As an alternative to cooperation between the operating system 118 and the application 120, the operating system 118 may perform all of the above functions itself. As a further alternative, the application 120 may perform all of the above functions itself. As yet a further alternative, the operating system 118 may cooperate with the application 120 in a manner different than that described above. These and other implementations are possible, and all such implementations are within the scope of the present invention.

In addition to the MPM 112, the media device 104 also includes one or more user interface component(s) 124, which are coupled to the MPM 112. The user interface component(s) 124 enable the MPM 112, and hence, the media device 104, to receive input from and provide output to a user. On the input side, the user interface component(s) 124 may include, for example, a keyboard/keypad having alphanumeric keys, a cursor control device (e.g. mouse, trackball, touchpad, etc.), a touch sensitive screen, a set of physical controls (e.g. buttons, knobs, control wheels, dials, etc.), a microphone for receiving audio input, etc. On the output side, the user interface component(s) 124 may include a graphical interface (e.g. a graphics card) and an audio interface (e.g. sound card) for providing visual and audio content. The user interface component(s) 124 may further include a display, a set of speakers, etc., for presenting audio and visual information to a user. In one embodiment, the operating system 118 and the one or more applications 120 executed by the processor(s) 114 may provide a software user interface that takes advantage of and interacts with the user interface component(s) 124 to receive input from and provide output to a user. This software user interface may, for example, provide a menu that the user can navigate, or buttons that the user can invoke, using one of the user input devices mentioned above.

In addition to the components set forth above, the media device 104 further includes one or more communication interface(s) 126, which are coupled to the MPM 112. These interface(s) 126 enable the MPM 112, and hence, the media device 104, to communicate with the portable presentation device 102 and with other components/devices. The communication interface(s) 126 may include, for example, one or more video and/or audio jacks for physically coupling with the portable presentation device 102, a wireless transmitter/receiver (e.g. Wifi, Bluetooth, etc.) for wirelessly communicating with the portable presentation device 102 and other devices, a network interface (wired or wireless) for enabling the media device 104 to send messages to and receive messages from a network, a 3G interface for enabling the media device 104 to access the Internet without using a local network, a telephone network interface for enabling the media device 104 to make and receive telephone calls, etc. These and other interfaces may be included in the communication interface(s) 126.

Sample Operation

With the above system description in mind, and with reference to FIGS. 1-3, operation of the system 100 in accordance with several embodiments of the presentation invention will now be described. In the following discussion, two sample implementations will be described: one in which the MPM 112 operates as a media content provider; and another in which the MPM 112 operates as a communication device. Because operation of the system is slightly different in these two implementations, they will be described separately. In the follow discussion, it will be assumed for the sake of illustration that the portable presentation device 102 provides sensor information to the media device 104 using a notification protocol.

Media Content Provider Implementation

In the embodiment shown in FIG. 1, the MPM 112 may be caused to behave as a media content provider by having the processor(s) 114 execute the operating system 118 and at least one of the applications 120. The application 120 may, for example, be: a media player application that retrieves media content from the storage(s) 116 and streams it to the portable presentation device 102; a gaming application that generates graphics and sounds; a media streaming application that receives streamed media content from a source (e.g. the Internet, cable, satellite, etc.) and streams it to the portable presentation device 102; or some other type of application. If the MPM 112 is not implemented in the manner shown in FIG. 1, then the MPM 112 may be custom constructed/configured to act as a media content provider.

In one embodiment, prior to regular operation, the MPM 112 interacts with a user to allow the user to specify how he/she would like the MPM 112 to behave under certain conditions. For example, the user can specify how the MPM 112 should behave when the portable presentation device 102; (1) is not worn by the user; (2) is fully worn by the user; or (3) is partially worn by the user (the portable presentation device 102 may be partially worn, for example, if the portable presentation device 102 is a pair of earphones and the user has only one of the earphones inserted in his/her ear). In the following description, a sample set of behaviors will be described for illustrative purposes. If so desired, the user may change the behaviors to suit his/her liking.

Figure 2:
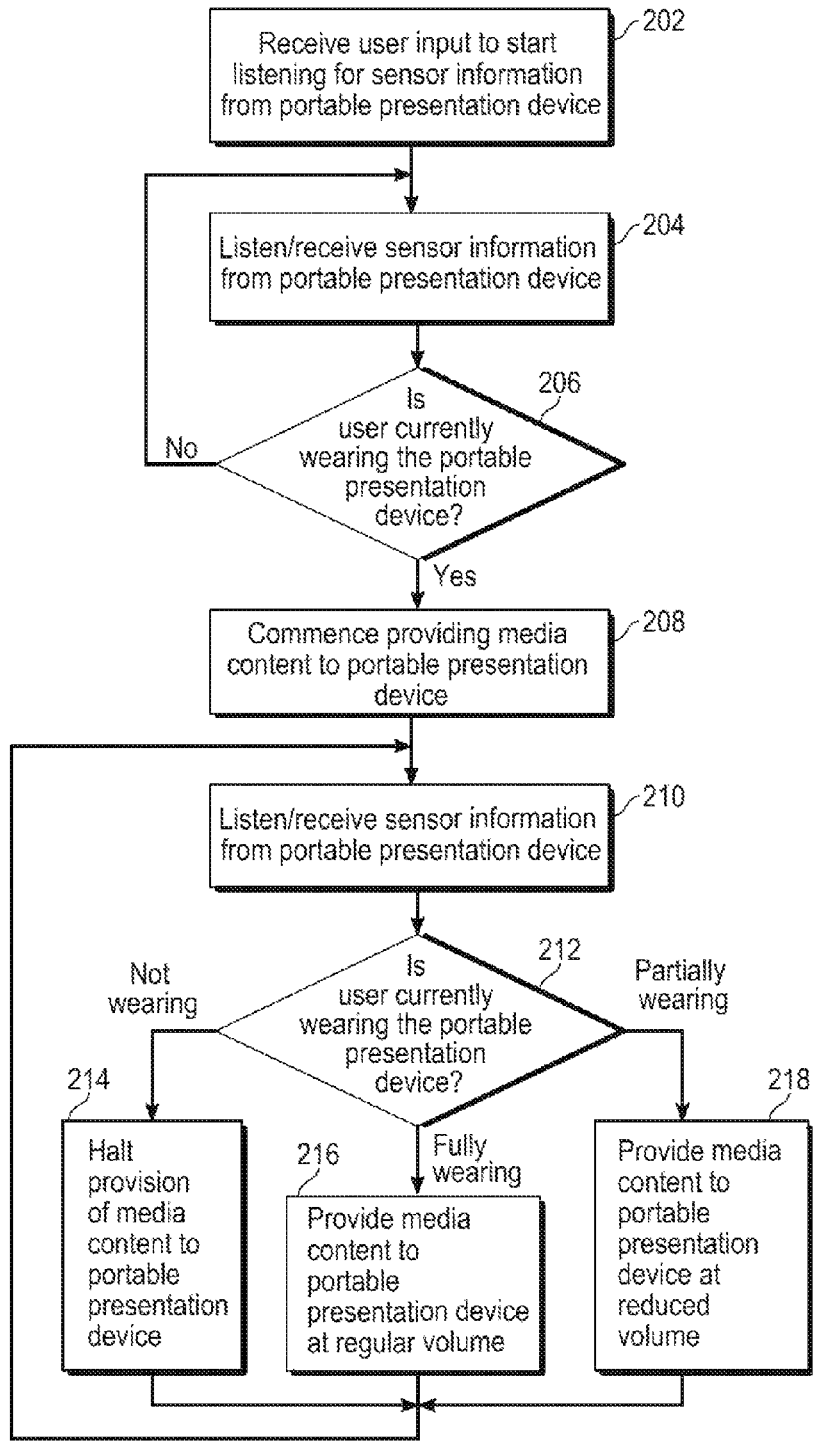
FIG. 2 is a flow diagram illustrating the operation of the MPM 112 of FIG. 1 in accordance with one embodiment of the present invention.

With reference to FIG. 2, there is shown a flow diagram illustrating the operation of the MPM 112 as a media content provider, in accordance with one embodiment of the present invention. Initially, the MPM 112 receives (block 202) input from the user instructing the MPM 112 to start listening for sensor information from the portable presentation device 102. This input may, for example, take the form of the user changing a setting in the operating system 118 or an application 120 to begin listening for sensor information, initiating the execution of an application 120, or activating a "start" control on a user interface. In response to this user input, the MPM 112 in one embodiment optionally pings the portable presentation device 102 to request an initial set of sensor information. The MPM 112 then enters into listen/receive mode (block 204), in which it waits for sensor information from the portable presentation device 102.

When a set of sensor information is provided by the portable presentation device 102 (either in response to the optional ping or in response to a change in the state of one of the sensor(s) 108), the sensor information is received by the MPM 112. This set of sensor information may include, for example, proximity sensor information, temperature sensor information, and pressure sensor information, or a subset thereof (depending on what sensors are included with the portable presentation device 102). Multiple sets of sensor information may be received (for example, if the portable presentation device is a pair of earphones, a separate set of sensor information may be received for each earphone).

Based at least in part upon the sensor information, which indicates a current physical relationship between the user and the portable presentation device 102, the MPM 112 determines (block 206) whether the portable presentation device 102 is currently being worn by the user in a manner that suggests that the user wishes to have media content provided to him/her. The MPM 112 makes this determination, for example, by checking the proximity sensor information to determine whether the user is within close proximity to the portable presentation device 102, checking the temperature sensor information to determine whether it is within a certain temperature range, and checking the pressure sensor information to determine whether the pressure indication is above a certain threshold. If there are several sets of sensor information (e.g. one set of sensor information for each earphone of a pair of earphones), the MPM 112 will perform these checks for each set of sensor information.

In one embodiment, if all of the sensor information in a set of sensor information indicates an affirmative, the MPM 112 will conclude that the portion of the portable presentation device 102 (e.g. a particular earphone) associated with that set of sensor information is currently being worn by the user. As an alternative, if most but not all of the sensor information in a set of sensor information indicates an affirmative, the MPM 112 may still conclude that the portion of the portable presentation device 102 associated with that set of sensor information is currently being worn by the user. By checking each set of sensor information, the MPM 112 is able to determine whether the portable presentation device 102; (1) is currently not being worn by the user: (2) is currently being fully worn by the user; or (3) is currently only partially being worn by the user (e.g. only one earphone of a pair of earphones is currently being worn).

In one embodiment, if the MPM 112 determines at block 206 that the portable presentation device 102 is currently not being worn by the user, the MPM 112 loops back to block 204 to remain in listen/receive mode to listen for another set of sensor information. In the current example, the portable presentation device 102 provides sensor information to the media device 104 using a notification protocol; thus, the portable presentation device 102 will provide a set of sensor information to the MPM 112 the next time it detects a change in the state of one or more of the sensor(s) 108. In the meantime, the MPM 112 waits. When it does eventually receive the next set of sensor information from the portable presentation device 102, the MPM 112 will again use the sensor information to determine whether the user is wearing the portable presentation device 102 in a manner that suggests that the user wishes to have media content presented to him/her.

If, at any point, the MPM 112 determines at block 206 that the portable presentation device 102 is currently being fully worn or at least partially being worn by the user, the MPM 112 automatically commences (block 208) providing media content to the portable presentation device 102. This media content may be, for example, media content retrieved from the storage(s) 116, media content generated by a game or other program, or media content streamed from a source. Thus, in this embodiment, the MPM 112 detects when the user is at least partially wearing the portable presentation device 102, and automatically begins providing media content to the portable presentation device 102 at that point. With such an embodiment, the user can cause the media device 104 to start providing media content just by putting the portable presentation device 102 on (the user does not have to invoke any controls of the media device 104).

Thereafter, the MPM 112 again enters into listen/receive mode (block 210) to wait for another set of sensor information from the portable presentation device 102, which will be sent by the portable presentation device 102 the next time it detects a change in the state of one or more of the sensor(s) 108. Until the next set of sensor information is received, the MPM 112 in one embodiment continues to provide media content to the portable presentation device 102. When a next set of sensor information is actually received, the MPM 112 uses the sensor information to determine (block 212) whether the user is currently wearing the portable presentation device 102 in a manner that suggests that the user wishes to have media content provided to him/her. This determination may be made in the manner described above, and can arrive at one of three possible conclusions: (1) the portable presentation device 102 is no longer being worn by the user; (2) the portable presentation device 102 is still being fully worn by the user; or (3) the portable presentation device 102 is only partially being worn by the user.

In one embodiment, if the MPM 112 determines that the portable presentation device 102 is no longer being worn by the user, it proceeds to block 214. What the MPM 112 does at block 214 depends upon the current state of the MPM 112. Specifically, if the MPM 112 is currently providing media content to the portable presentation device 102, then the MPM 112 automatically halts the provision of media content to the portable presentation device 102. In doing so, the MPM 112 may pause or stop the media content at a certain point of the media content. This halting process may involve halting the execution of an application 120. For example, if the application is a game, halting the provision of media content to the portable presentation device 102 may include halting or pausing the execution of the game. As part of the halting process, the MPM 112 may put the media device 104 into a reduced power consumption mode (e.g. sleep mode). The MPM 112 may do this immediately, or after provision of media content has been halted for a certain period of time. If the MPM 112 had previously halted provision of media content to the portable presentation device 102, then the provision of media content remains halted. After performing block 214, the MPM 112 loops back to block 210 to once again enter listen/receive mode to wait for the next set of sensor information from the portable presentation device 102; thus, the MPM 112 continues to monitor the physical relationship between the user and the portable presentation device 102.

Returning to block 212, if the MPM 112 determines that the portable presentation device 102 is currently being partially worn by the user, then the MPM 112 proceeds to block 218. What the MPM 112 does at block 218 depends upon the current state of the MPM 112. Specifically, if the MPM 112 is currently providing media content to the portable presentation device 102, then the MPM 112 in one embodiment will continue to provide media content to the portable presentation device 102, but at a reduced volume. If the media content was already being provided at a reduced volume, then the media content remains being provided at the reduced volume. On the other hand, if the MPM 112 had previously halted provision of media content to the portable presentation device 102, then the MPM 112 resumes providing media content to the portable presentation device 102, but at a reduced volume. Provision of the media content may be resumed at the point of the media content at which it was previously paused or stopped. This resumption process may involve resuming execution of an application 120. For example, if the media content is generated by a game, resuming the provision of media content to the portable presentation device 102 may include resuming the execution of the game. The resumption process may also involve putting the media device 104 back into a regular power consumption mode. After performing block 218, the MPM 112 loops back to block 210 to once again enter listen/receive mode to wait for the next set of sensor information from the portable presentation device 102; thus, the MPM 112 continues to monitor the physical relationship between the user and the portable presentation device 102.

Returning again to block 212, if the MPM 112 determines that the portable presentation device 102 is currently being fully worn by the user, then the MPM 112 proceeds to block 216. What the MPM 112 does at block 216 depends upon the current state of the MPM 112. Specifically, if the MPM 112 is currently providing media content to the portable presentation device 102 at regular volume, then it continues to provide media content at regular volume. If the MPM 112 is currently providing media content to the portable presentation device 102 at a reduced volume, then it begins providing the media content at regular volume. On the other hand, if the MPM 112 had previously halted provision of media content to the portable presentation device 102, then the MPM 112 resumes providing media content to the portable presentation device 102, at regular volume. Provision of the media content may be resumed at the point of the media content at which it was previously paused or stopped. This resumption process may involve resuming execution of an application 120. For example, if the media content is generated by a game, resuming the provision of media content to the portable presentation device 102 may include resuming the execution of the game. The resumption process may also involve putting the media device 104 back into a regular power consumption mode. After performing block 216, the MPM 112 loops back to block 210 to once again enter listen/receive mode to wait for the next set of sensor information from the portable presentation device 102; thus, the MPM 112 continues to monitor the physical relationship between the user and the portable presentation device 102.

In the above example, when the MPM 112 determines that the portable presentation device 102 is partially being worn by the user, it provides media content to the portable presentation device 102 at a reduced volume. As an alternative, the MPM 112 may treat partial wearing of the portable presentation device 102 as a non-wearing of the portable presentation device 102, and cause provision of the media content to be halted. As another alternative, the MPM 112 may treat partial wearing of the portable presentation device 102 as a full wearing of the portable presentation device 102, and cause provision of the media content to be continued at regular volume. These and other variations are within the scope of the present invention.

In the manner described, the MPM 112 determines whether a user is currently wearing the portable presentation device 102 in a manner that suggests that the user wishes to have media content provided to him/her, and adjusts its behavior automatically. By doing so, the MPM 112 makes using the media device 104 and the portable presentation device 102 as a unit more convenient, pleasant, and power efficient.

Communication Device Implementation

In addition or as an alternative to a media content provider, the MPM 112 may behave as a communication device. In the embodiment shown in FIG. 1, the MPM 112 may be caused to behave as a communication device by having the processor(s) 114 execute at least one of the applications 120. The application 120 may, for example, be: a telephone application for enabling voice communication over a telephone network; a video conferencing application for enabling video and voice communication over a data or telephone network; or some other type of application. If the MPM 112 is not implemented in the manner shown in FIG. 1, then the MPM 112 may be custom constructed/configured to act as a communication device.

In one embodiment, prior to regular operation, the MPM 112 interacts with a user to allow the user to specify how he/she would like the MPM 112 to behave under certain conditions. For example, the user can specify how the MPM 112 should behave when the portable presentation device 102: (1) is not worn by the user; (2) is fully worn by the user; or (3) is partially worn by the user. In the following description, a sample set of behaviors will be described for illustrative purposes. If so desired, the user may change the behaviors to suit his/her liking.

Figure 3:
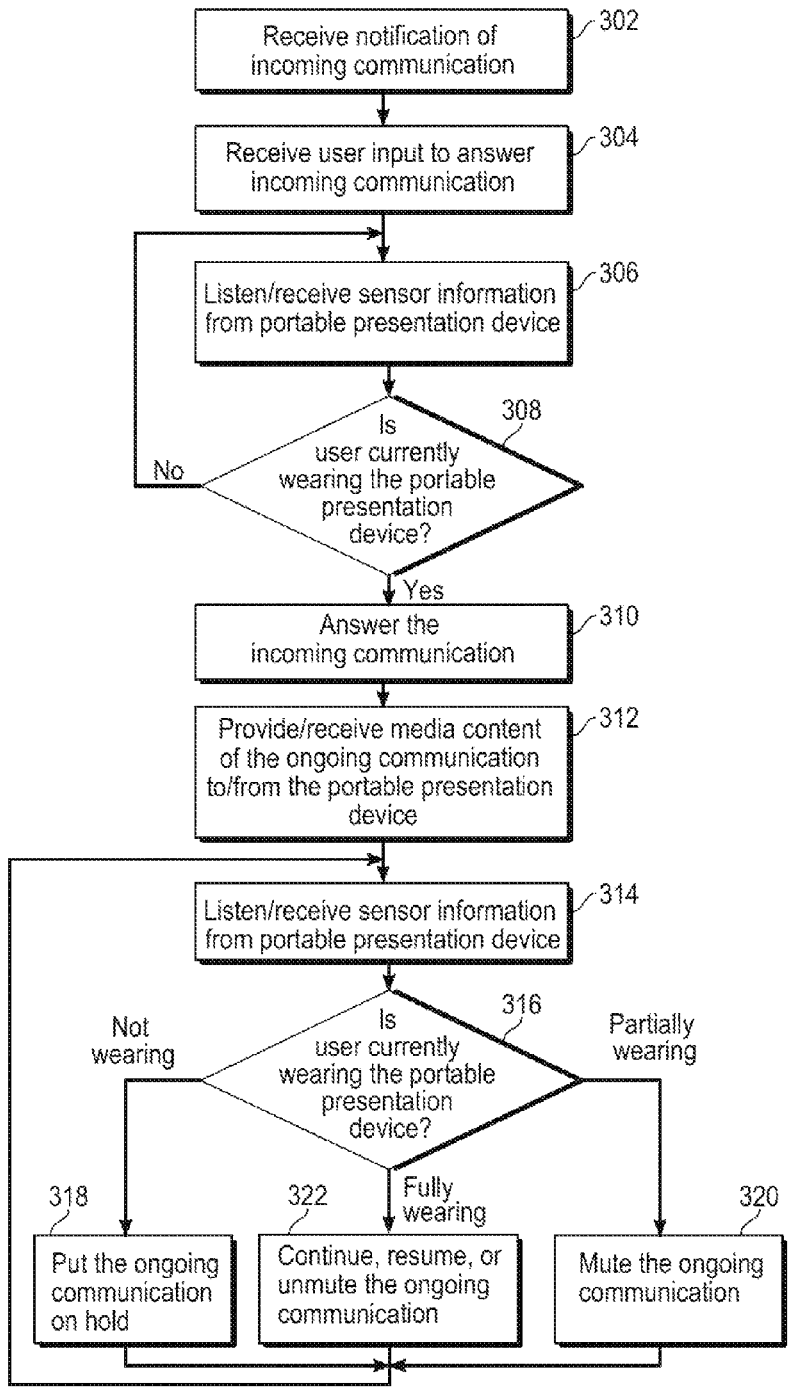
FIG. 3 is a flow diagram illustrating the operation of the MPM 112 of FIG. 1 in accordance with another embodiment of the present invention.

With reference to FIG. 3, there is shown a flow diagram illustrating the operation of the MPM 112 as a communication device, in accordance with one embodiment of the present invention. Initially, the MPM 112 receives (block 302) notification of an incoming communication. The incoming communication may be, for example, a telephone call, an incoming video conferencing communication, or some other type of communication. The notification may be a ring, a beep, a visual message, or some other type of notification, in response to the notification, the user may optionally invoke a control of the MPM 112 to instruct the MPM 112 to answer the incoming communication. If the user does so, the MPM 112 receives (block 304) this user input. In one embodiment, the MPM 112 does not immediately answer the incoming communication, even if input is received from the user instructing the MPM 112 to answer the incoming communication. Rather, the MPM 112 in one embodiment optionally pings the portable presentation device 102 to request a current set of sensor information, and enters into listen/receive mode (block 306) to wait for the sensor information from the portable presentation device 102.

When a set of sensor information is provided by the portable presentation device 102 (either in response to the optional ping or in response to a change in the state of one of the sensor(s) 108), the sensor information is received by the MPM 112. This sensor information may include, for example, proximity sensor information, temperature sensor information, and pressure sensor information, or a subset thereof (depending on what sensors are included with the portable presentation device 102). Multiple sets of sensor information may be received (for example, if the portable presentation device is a pair of earphones, a separate set of sensor information may be received for each earphone).

Based at least in part upon the sensor information, which provides an indication of a current physical relationship between the user and the portable presentation device 102, the MPM 112 determines (block 308) whether the portable presentation device 102 is currently being worn by the user in a manner that suggests that the user wishes to have media content presented to him/her. The MPM 112 makes this determination, for example, by evaluating the sensor information in the manner described previously. By evaluating the sensor information, the MPM 112 is able to determine whether the portable presentation device 102: (1) is currently not being worn by the user; (2) is currently being fully worn by the user; or (3) is currently only partially being worn by the user.

In one embodiment, if the MPM 112 determines that the portable presentation device 102 is not currently being worn by the user, the MPM 112 does not answer the incoming communication. This is despite the fact that the user may have instructed the MPM 112 to answer the incoming communication. Instead, the MPM 112 loops back to block 306 to remain in listen/receive mode to listen for another set of sensor information. In the current example, the portable presentation device 102 provides sensor information to the media device 104 using a notification protocol; thus, the portable presentation device 102 will provide a set of sensor information to the MPM 112 the next time it detects a change in the state of one or more of the sensor(s) 108. In the meantime, the MPM 112 waits. When it does eventually receive the next set of sensor information from the portable presentation device 102, the MPM 112 will again use the sensor information to determine whether the user is wearing the portable presentation device 102 in a manner that suggests that the user wishes to have media content presented to him/her.

If, at any point, the MPM 112 determines at block 308 that the portable presentation device 102 is currently being fully worn or at least partially being worn by the user, the MPM 112 automatically answers (block 310) the incoming communication. Thus, with this embodiment, the MPM 112 does not answer an incoming communication unless and until the user is at least partially wearing the portable presentation device 102. Also, with this embodiment, the user can answer an incoming communication just by putting the portable presentation device 102 on (the user does not have to invoke any controls of the media device 104).

After the incoming communication is answered, the MPM 112 provides/receives (block 312) media content to/from the portable presentation device 102. This media content may include, for example, voice, speech, video, or other content from the now ongoing communication that is received from a communicating party and provided to the portable presentation device 102. The media content may also include speech or other content that is received from the user and the portable presentation device 102 (via the microphone 107) and provided to the communicating party.

Thereafter, the MPM 112 again enters into listen/receive mode (block 314) to wait for another set of sensor information from the sensor(s) of the portable presentation device 102, which will be sent by the portable presentation device 102 the next time it detects a change in the state of one or more of the sensor(s) 108. Until the next set of sensor information is received, the MPM 112 in one embodiment continues to provide/receive media content from the ongoing communication to/from the portable presentation device 102.

When a next set of sensor information is actually received, the MPM 112 uses the sensor information to determine (block 316) whether the user is currently wearing the portable presentation device 102 in a manner that suggests that the user wishes to have media content presented to him/her. This determination may be made in the manner described above, and can arrive at one of three possible conclusions: (1) the portable presentation device 102 is no longer being worn by the user; (2) the portable presentation device 102 is still being fully worn by the user; or (3) the portable presentation device 102 is only partially being worn by the user.

In one embodiment, if the MPM 112 determines that the portable presentation device 102 is no longer being worn by the user, it proceeds to block 318. What the MPM 112 does at block 318 depends upon the current state of the MPM 112. Specifically, if MPM 112 is currently providing/receiving media content from the ongoing communication to/from the portable presentation device 102, then the MPM 112 in one embodiment automatically puts the ongoing communication on hold. If the MPM 112 had previously put the ongoing communication on hold, then the MPM 112 keeps the ongoing communication on hold. If the MPM 112 had previously muted the ongoing communication (so that the user can hear the communicating party but not vice versa), then the MPM 112 puts the ongoing communication on hold. After performing block 318, the MPM 112 loops back to block 314 to once again enter listen/receive mode to wait for the next set of sensor information from the portable presentation device 102; thus, the MPM 112 continues to monitor the physical relationship between the user and the portable presentation device 102.

Returning to block 316, if the MPM 112 determines that the portable presentation device 102 is currently being partially worn by the user, then the MPM 112 proceeds to block 320. What the MPM 112 does at block 320 depends upon the current state of the MPM 112. Specifically, if MPM 112 is currently providing/receiving media content from the ongoing communication to/from the portable presentation device 102, then the MPM 112 mutes the ongoing conversation so that the user can hear the communicating party but not vice versa. If the ongoing conversation had previously been muted, then the MPM 112 keeps the ongoing communication muted. On the other hand, if the MPM 112 had previously put the ongoing conversation on hold, then the MPM 112 takes the ongoing conversation off of hold, and mutes it. After performing block 320, the MPM 112 loops back to block 314 to once again enter listen/receive mode to wait for the next set of sensor information from the portable presentation device 102; thus, the MPM 112 continues to monitor the physical relationship between the user and the portable presentation device 102.

Returning again to block 316, if the MPM 112 determines that the portable presentation device 102 is currently being fully worn by the user, then the MPM 112 proceeds to block 322. What the MPM 112 does at block 216 depends upon the current state of the MPM 112. Specifically, if MPM 112 is currently providing/receiving media content from the ongoing communication to/from the portable presentation device 102, then it continues to do so. If the ongoing communication is currently muted, then the MPM 112 takes it off of mute and resumes providing/receiving media content from the ongoing communication to/from the portable presentation device 102. On the other hand, if the MPM 112 had previously put the ongoing communication on hold, then the MPM 112 takes the ongoing communication off of hold, and resumes providing/receiving media content from the ongoing communication to/from the portable presentation device 102. After performing block 322, the MPM 112 loops back to block 314 to once again enter listen/receive mode to wait for the next set of sensor information from the portable presentation device 102; thus, the MPM 112 continues to monitor the physical relationship between the user and the portable presentation device 102.

In the above example, when the MPM 112 determines that the portable presentation device 102 is not being worn by the user, it puts the ongoing communication on hold. As an alternative, the MPM 112 may mute the ongoing communication instead. Also, in the above example, when the MPM 112 determines that the portable communication device 102 is partially being worn by the user, the MPM 112 mutes the ongoing communication. As an alternative, the MPM 112 may put the ongoing communication on hold instead, or it may continue to provide/receive media content from the ongoing communication to/from the portable presentation device 102 as if the portable presentation device 102 were still being fully worn by the user. These and other variations are within the scope of the present invention.

In the manner described, the MPM 112 determines whether a user is currently wearing the portable presentation device 102 in a manner that suggests that the user wishes to have media content presented to him/her, and adjusts its behavior automatically. By doing so, the MPM 112 makes using the media device 104 and the portable presentation device 102 as a unit more convenient and pleasant.

In the foregoing specification, embodiments of the present invention have been described with reference to numerous specific details that may vary from implementation to implementation. Thus, the sole and exclusive indicator of what is the invention, and is intended by the Applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for operating an electronic device, comprising:
 with a media presentation mechanism in the electronic device, presenting media content to the user, wherein the media content includes audio content and video content;
 with circuitry in the electronic device, determining a position of the electronic device relative to the user's body based on sensor data from a sensor in the electronic device;

in response to determining that the electronic device is partially worn by the user, automatically performing a first adjustment to the media content presented to the user; and in response to determining that the electronic device is not worn by the user, automatically performing a second adjustment to the media content presented to the user.

2. The method defined in claim 1 further comprising:

with wireless communications circuitry in the electronic device, receiving the media content from an external electronic device.

3. The method defined in claim 1 wherein the sensor comprises a proximity sensor, the method further comprising:

with the proximity sensor, gathering the sensor data indicating a proximity of the user's body to the electronic device.

4. The method defined in claim 1 wherein the sensor comprises a temperature sensor, the method further comprising:

with the temperature sensor, gathering the sensor data indicating a temperature of the user's body.

5. The method defined in claim 1 wherein the sensor comprises a pressure sensor, the method further comprising:

with the pressure sensor, gathering the sensor data indicating whether the electronic device is pressed against the user's body.

6. The method defined in claim 1, wherein the electronic device comprises a pair of earphones, wherein the media presentation mechanism comprises speakers within the pair of earphones, wherein presenting the media content to the user comprises presenting the audio content at a first volume level, wherein determining that the electronic device is partially worn by the user comprises determining that the user is wearing only one earphone of the pair of earphones, and wherein automatically performing a first adjustment to the media content presented to the user comprises:

presenting the audio content to the user at a second volume level that is lower than the first volume level.

7. The method defined in claim 1 wherein the media presentation mechanism comprises a display and wherein presenting the media content to the user comprises presenting the video content to the user using the display.

8. The method defined in claim 1 wherein automatically performing the second adjustment to the media content presented to the user comprises automatically halting the presentation of the media content in response to determining that the electronic device is not on the user's body.

9. An electronic device, comprising:

a display that provides visual content to a user;

a speaker that provides audio content to the user;

a sensor that gathers sensor data indicating a position of the electronic device relative to the user's body; and circuitry that controls operation of the speaker and the display based on the sensor data indicating the position of the electronic device relative to the user's body, performs a first adjustment to the operation of the speaker when the electronic device is partially worn by the user, and performs a second adjustment to the operation of the speaker when the electronic device is not worn by the user.

10. The electronic device defined in claim 9 wherein the sensor comprises a proximity sensor.

11. The electronic device defined in claim 9 wherein the sensor comprises a temperature sensor.

12. The electronic device defined in claim 9 wherein the sensor comprises a pressure sensor.

13. The electronic device defined in claim 9 wherein the circuitry adjusts the audio content based on the sensor data indicating the position of the electronic device relative to the user's body.

\* \* \* \* \*